March 16, 1948.  C. L. BEWARD  2,437,873
METHOD OF MAKING VEHICLE TIRES
Filed Feb. 2, 1942  2 Sheets-Sheet 1
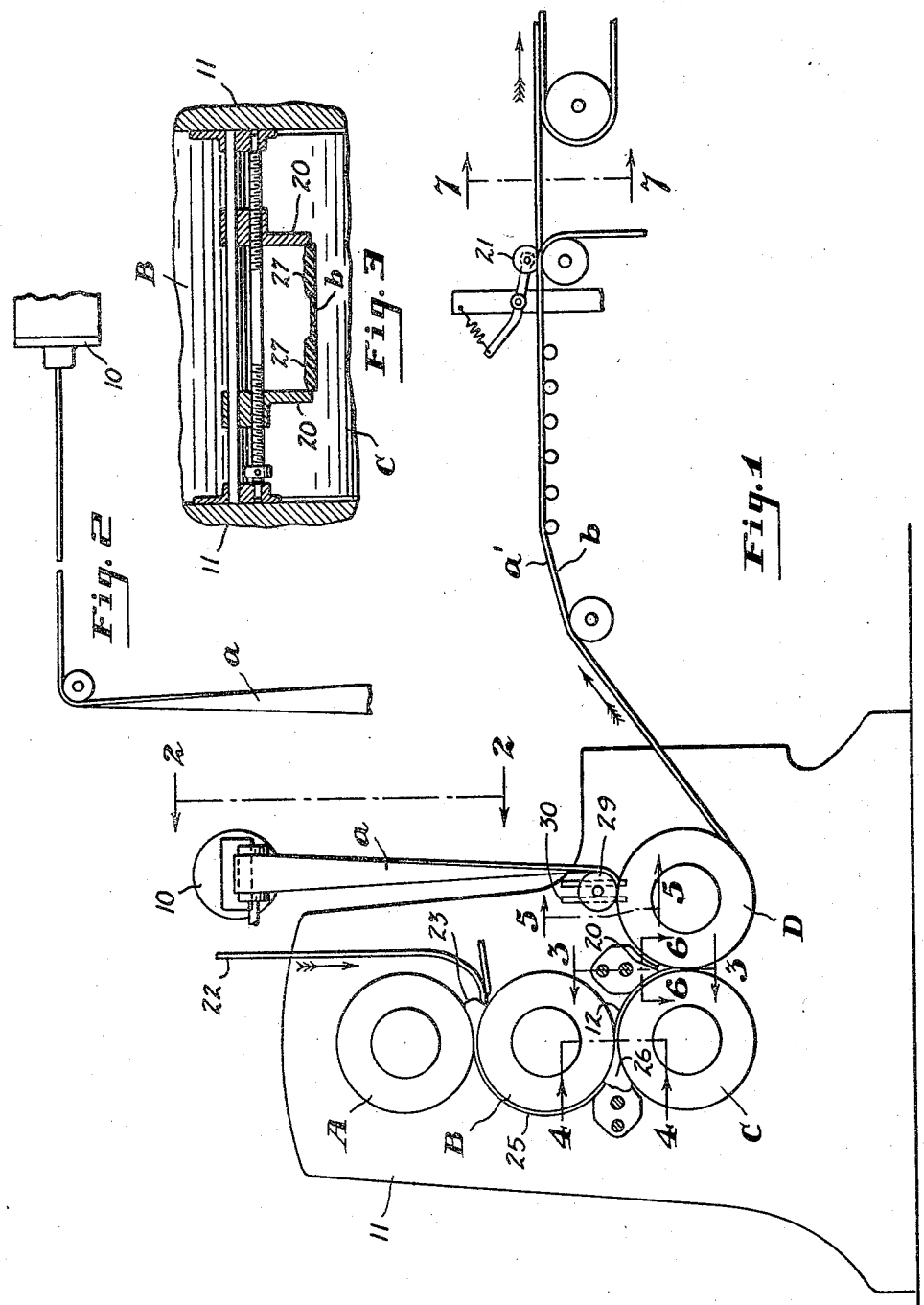
INVENTOR
*Chalmer L. Beward*
BY *Evans & McCoy*
ATTORNEYS March 16, 1948.                C. L. BEWARD                2,437,873
METHOD OF MAKING VEHICLE TIRES
Filed Feb. 2, 1942                                2 Sheets-Sheet 2
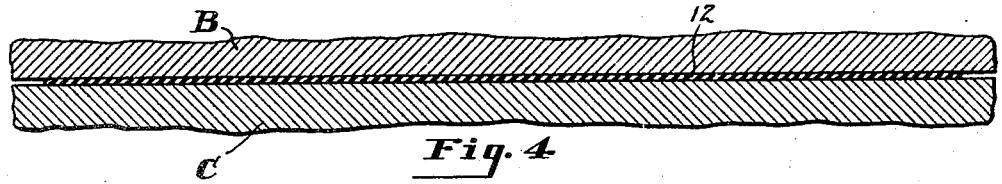
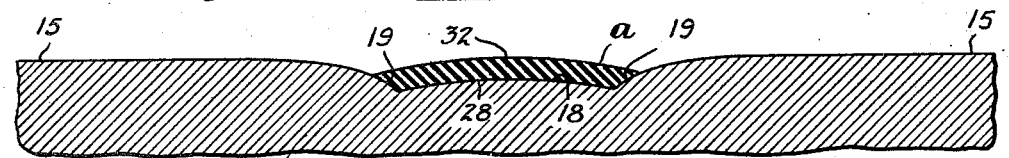
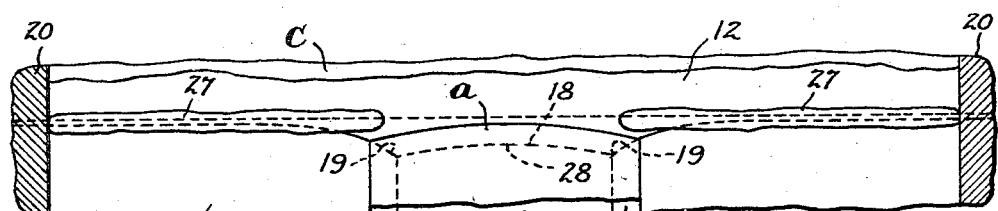
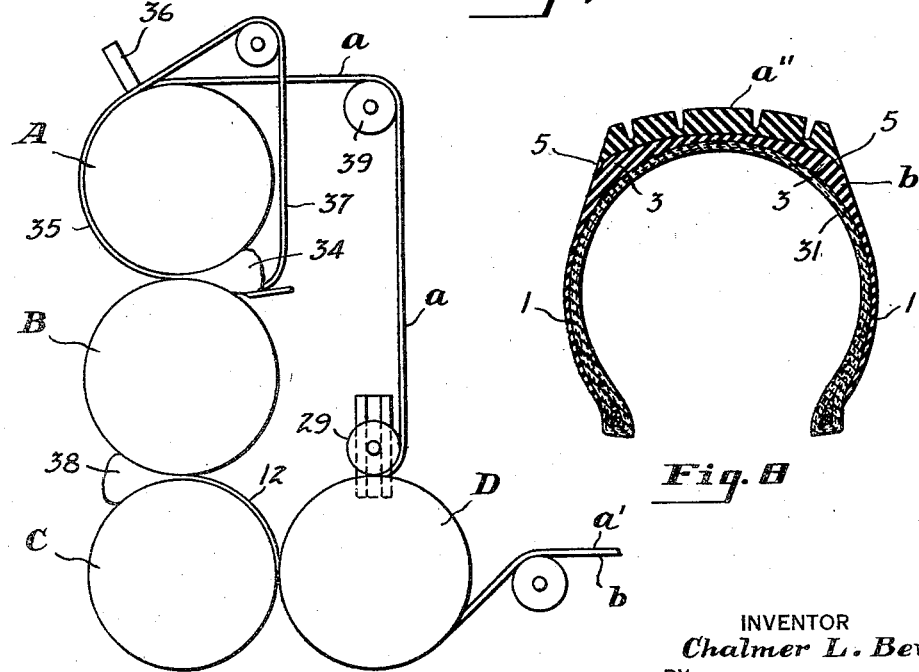
INVENTOR
Chalmer L. Beward
BY
Evans & McCoy
ATTORNEYS Patented Mar. 16, 1948

2,437,873

UNITED STATES PATENT OFFICE 2,437,873

METHOD OF MAKING VEHICLE TIRES

Chalmer L. Beward, Akron, Ohio, assignor to The General Tire & Rubber Company, Akron, Ohio, a corporation of Ohio Application February 2, 1942, Serial No. 429,140

10 Claims. (Cl. 154—9)

This invention relates to the manufacture of vehicle tires and particularly to the manufacture of composite tread and side wall strips for application to tire carcasses on a building drum.

In usual practice, the tread and outer side walls of a tire are formed of a single strip of rubber compound which is cut to the proper length, applied upon and vulcanized to the fabric carcass of the tire. The rubber compound from which the wear-resistant tread portion of the tire is formed should have a relatively heavy loading of carbon black to increase its wearing properties. The covering for the side wall portions of the tire, however, are preferably of a softer, more elastic rubber compound to provide increased resistance to flex cracking. Also, a softer rubber adjacent the tire carcass provides better adhesion to the carcass.

Heretofore, it has been proposed to form the composite tread and side wall strips of two different rubber compositions, with the medial relatively thick body portion of the strip from which the tread in the finished article is to be formed of a relatively hard composition and with the relatively thin side margins of the strip, which are adapted in the finished article to form the side walls of the tire, of a softer composition.

In the manufacture of composite tread and side wall strips heretofore proposed, the base of the composite strip, consisting of the marginal portions for formation of the side walls and an intermediate connecting web portion, is preformed in substantially the shape desired in the final article so that it will receive a separately preformed tread strip without appreciable deformation. Composite strips formed in this manner, wherein there is an abrupt juncture between the relatively hard tread strip and the softer marginal portions, are undesirable for the reason that concentration of stress is likely to occur at this abrupt juncture to cause cracking and separation of the tread portion from the side wall portion of the finished article.

It is therefore an object of the present invention to provide a composite tread and side wall strip having a relatively hard, wear-resistant medial portion and a softer base portion wherein there is no abrupt termination of the medial tread portion into the marginal base portion.

It is another object of the present invention to provide a method of preparing composite tread and side wall strips for application to band-built tire carcasses, which treads have a wear-resistant medial portion firmly bonded to a softer base and marginal portion through an interface between the compounds of greater area than in strips heretofore produced.

It is another object of the present invention to provide a relatively rapid and inexpensive method of producing composite tread and side wall strips of different materials, wherein the base portion of the strip does not need to be preformed to final shape prior to the addition of the relatively hard tread portion and wherein the union of the tread portion with the base portion is less abrupt than in strips heretofore prepared.

Another object of the invention is to join the freshly calendered tread portion with the base and side wall strips under calendering pressure in a simple conventional calender.

It is a further object of the present invention to provide a continuous method of manufacturing composite tread and side wall strips for vehicle tires wherein the relatively softer base portion of the strips is not preformed to final shape before union with the more wear-resistant tread forming portion and wherein the portions are united under calendering pressure.

It is a still further object to provide a tire having a hard, wear-resistant tread and softer side wall coverings connected by a web and having increased interfacial area between the vulcanized compounds of the tread and side wall portions.

Other objects will be apparent from the following detailed description of the invention as evidenced by the accompanying drawings, in which:

Figure 1 is a diagrammatic elevational view of apparatus embodying the present invention suitable for forming composite strips of the present invention showing the rubber compounds in positions occupied during the forming process;

Fig. 2 is an elevational view from the line 2—2 of Fig. 1 showing the method of feeding tubed tread strip to the calender rolls;

Fig. 3 is a sectional view on the line 3—3 of Fig. 1 illustrating the adjustable stops;

Fig. 4 is a sectional view on the line 4—4 of Fig. 1;

Fig. 5 is a sectional view on the line 5—5 of Fig. 1;

Fig. 6 is a top plan view of a portion of the apparatus seen from lines 6—6 of Fig. 1 showing the two rubber compounds used in forming the composite strip at the moment of their union;

Fig. 7 is a sectional view through a composite tread and side wall strip embodying the present invention as viewed from line 7—7 of Fig. 1;

Fig. 8 is a sectional view through a portion of a tire embodying the present invention; and Fig. 9 is a diagrammatic side elevational view of a modified form of apparatus embodying the present invention and which may be used in producing composite strips of the present invention.

Referring to the drawing, and more particularly to Fig. 7, composite strips of the present invention have a central tread portion $a'$ of relatively highly loaded wear-resistant rubber compound and a base portion $b$, preferably of more flexible and of relatively softer rubber compound. The tread strip has greater width than height, the width about corresponding to the tread of the tire to be formed. It may have a rectangular cross section or, preferably, a trapezoidal cross section with relatively sharp edges, the lower face being wider than the upper face.

The base portion $b$ comprises marginal portions 1 adapted to form the covering for the side wall of the completed tire. The marginal portions are connected by a central web portion 2, which serves to connect the tread portion $a'$ with the tire carcass. The marginal portions 1 are usually relatively thin at their outer edges and increase in thickness towards the center of the strip, with maximum thickness reached in longitudinal ridges 3 in the neighborhood of the juncture of the marginal portions with the tread portion. The ridges 3 are positioned in the composite tread so that when the tread is applied to the tire carcass they will lie in the shoulder portions of the tire. The web portion 2 preferably falls away in thickness from the ridges 3 to provide a channel in which the major portion of the strip $a$ is carried to form the tread portion $a'$ of the composite strip. The tread portion $a'$ overlies and is strongly bonded to the web portion of the base $b$ between the ridges 3.

According to the present invention, the tread portion has marginal edge portions 5 which are preferably tapered and overlie the ridges 3, so that when the composite strip is molded in a tire, the wear-resistant tread compound of the edge portions 5 extends beyond the shoulder and part way up the side wall of the tire. The interface between the rubber compound of the tread portion $a'$ and the rubber compound of the base $b$ preferably is uneven or contains undulations as when the compounds were subject to flow after contact. The undulations or roughness of the surface provide larger interfacial area between the compounds of the tread portion $a'$ and the base $b$ than when both the tread portion and the base are separately formed to final shape with smooth surfaces and simply pressed together. The undulations in the tread and base portions are complemental as when the tread strip is united to the base strip under calendering pressure and under conditions of turbulence in accordance with the method hereinafter set forth.

Referring particularly to Figs. 1 to 6, inclusive, suitable apparatus for forming the composite treads of the present invention may comprise means, such as a suitable extruding unit 10, for extruding or forming the tread strip $a$ in the desired shape, means, such as coacting rolls in a suitable calender 11, for forming a rubber compound into a relatively flat strip having greater width than the tread strip, and means, including a contour roll and a backing roll, for shaping the rubber of the flat strip into the form it occupies in the base portion of the composite strip and for substantially simultaneously uniting the preformed tread portion $a$ thereto under calender pressure and preferably under conditions of turbulence or flow, in at least one rubber compound forming the composite strip.

The calender preferably used is of the three-roll, contour type, having rolls A, B, C and D arranged in conventional manner. One calender roll, D, is shaped to substantially the contour desired for the upper surface of a composite strip suitable for application on a drum to a tire carcass. The rolls A, B and C, the latter serving as a backing roll for the contour roll D, may be of conventional cylindrical form. The contour roll D may have cylindrical end portions 15 and an intermediate formed portion between the stops 20 of the width desired for the composite tread and side wall strips of the present invention.

The formed portion has an annular groove or channel, preferably having convex-like or rounded annular bottom face 18 and outwardly inclining sides 19. The channel 17 is suitably shaped to receive the preformed tread strip $a$. The diameter of the roll D preferably is smallest at the juncture of the base 18 with the sides 19 of the channel and becomes progressively larger until the maximum diameter of the cylindrical portion 15 is reached. The opening between the coacting rolls C and D corresponds substantially to the cross section of the desired composite strip taking into account the elasticity of the compound. The stops 20 provided in the bight between rolls C and D decrease the tendency for flow of rubber toward the end of the rolls; the distance between the stops 20 may be adjusted to equal or exceed the overall width desired in the composite strip. If the calendered width of the composite strip is greater than desired, suitable trimmers 21 may be provided to trim excess flexible stock from the outer edges of the marginal portions 1.

In the formation of composite strips embodying the present invention, the base portion and the tread portion are united under calender pressure. The rubber compound 22, of a type suitable for forming the side wall portion of the composite strip, may be continuously fed from a suitable source, such as a warm-up mill, into the bight and between the upper and intermediate rolls A and B, respectively. The amount of rubber in the bight is sufficient to provide a suitable bank 23 and the rubber compound emerging from between the rolls A and B may be in the form of a flat sheet 25 having substantially the average thickness of the base portion $b$. A bank of rubber 26 may also be provided between rolls B and C to increase uniformity of the gauge of base strip 12, if desired. The thickness of the sheeted compound forming the base strip 12, like that of sheet 25, is substantially equal to the average thickness of base portion $b$ of the composite strip, so that the small bank of rubber formed by operation of rolls C and D remains of substantially constant size. The thickness of the relatively flat base strip 12 is greater than the thickness of the edge portions of the marginal portions 1 of the composite strip, so that when the compound of the strip 12 passes between the contour roll D and the backing roll C the small bank 27 of the compound 12 is formed and a flow of the compound 12 toward the medial portion of the contour roll D takes place to assist in forming the longitudinal ridges 3 and to cause turbulence at the interface between the tread strip $a$ and the base portion $b$.

Means is provided for feeding or incorporating the preformed tread strip $a$ into the annular channel of the contour roll with its narrower or upper face 28 in contact with the bottom curved portion 18 of the channel and for applying tension thereto to cause it to conform to the shape of the groove. This means may comprise a suitable tension roll 29 which is rotatably carried in slides 30 and is adapted to ride on the roll D. The preformed tread strip $a$ from the tuber 10 is passed under roll 29 and over the roll D and by the tension due to the drag of the roll 29 it is pulled into the channel 17 and into conformity with the rounded base 18 thereof. The tread strip $a$ in the channel on the roll D is carried into contact with the sheeted rubber compound 12 on the roll C and united thereto under calendering pressure. Probably due to the fact that the outer medial portion 32 (Fig. 5) of the strip $a$ on the roll D travels at a somewhat greater speed than the marginal portions of the strip $a$, due to the larger diameter of the base of the channel 28 at its medial portion, there appears to be a somewhat higher pressure on the medial portion of the strip $a$ than at its edges. This differential pressure or differential in flow resistance causes flow of the compound thereof toward the end portions and beyond. The flow of the compound from the strip $a$ towards the ends of the roll D meeting with the opposite flow of the rubber from the bank 27 toward the axis or medial portion of the composite strip apparently causes some turbulence at the interface between the strips $a$ and $b$ with the result that the two compounds are worked together so that a wavy intreface and excellent adhesion is obtained.

When the tread strip and the base are united in this manner, it has been found that the flow of the flexible compound 12 from the bank 27 automatically provides the desired ridges 3 at the shoulder portions of the composite tread. It has also been found that when the preformed strip $a$ is united to the base $b$ in this manner the compound of the preformed strip $a$ flows laterally along the contour roll to provide tapered edges 5 which overlie or tend to overlie the ridges 3 of the base portion, thus preventing abrupt termination of the medial tread portion $a'$.

Because of the turbulence of the bank 27 and the flow of the compound in the strip $a$ undulations are produced over the major portion of the interface between the tread portion $a'$ and the base portion $b$. These undulations further alleviate any tendency of separation of the tread from the side wall stock of the tires produced.

Referring particularly to Fig. 8, the tires embodying the present invention may comprise a carcass of conventional form having a number of plies of stretch-resistant elements extending between the beads, the stretch-resistant elements in alternate plies being substantially parallel and at an angle to those in adjacent plies as in conventional tires. When the composite strip illustrated in Fig. 7 is suitably incorporated in the tire, it is seen that the side wall rubber compound 1 of the side wall covering extends continuously over the crown of the tire from adjacent the beads. The relatively thick ridges 3 in which the side walls terminate form a thickened shoulder adjacent the edges of the road contacting surface thereof. The wear-resistant tread compound $a''$ which forms the tread of the tire extends over the shoulders with the interface and the marginal portions 5 extending partly up onto the side walls to provide extra protection for the side walls adjacent the shoulder.

Referring particularly to Fig. 9, which illustrates a modified form of apparatus whereby an entire composite tread and side wall strip may be produced on a single contour calender, the tread strip is formed from the bank of rubber 34 supplied to the bight between rolls A and B. The roll A preferably has greater speed than has intermediate roll B and the sheeted tread compound 35 is carried over the top of the roll A, where it is trimmed or skived to suitable width and shape by the trimmer 36. The stock 37 trimmed from the edges of the strip $a$ is returned to the bank of rubber 34. The base strip 12 of sheeted flexible compound for forming the base $b$ of the composite tread is formed from the bank 38 by the interaction of the rolls B and C. The tread strip $a$ may be passed over the roll 39 and between the tension roll 29 and the contour roll D, as above described. The speed of rolls C and D is approximately equal and greater than the speed of intermediate roll B. The speed of the upper roll A is preferably somewhat less than that of rolls C and D to compensate for the stretch imparted in the strip $a$ by the roll 29 which cooperates with the roll D. Since the usual calender is several times wider than the width of the composite strip, separating blocks may be interposed between portions of the rolls so that a single pair of rolls may serve both to calender and to warm-up the supply of rubber compound for bank 34 or 38, if desired.

Furthermore, it is to be understood that the particular form of product shown and described and the particular procedure set forth are presented for purposes of explanation and illustration and that various modifications of said product and procedure can be made without departing from my invention as defined in the appended claims.

What I claim is:

1. A method of preparing composite tread and side wall strips having a tread portion and a base portion of different rubber compounds, which comprises forming a tread strip by shaping a relatively wear-resistant compound to a strip having suitable width for forming the road contacting surface of a tire, separately shaping a different rubber compound, of a type suitable for side wall coverings of a tire, to a base strip having greater width than that of said tread strip, feeding said tread strip against said base strip, and while retaining said tread strip in a form having a curved transverse and longitudinal section causing flow of rubber compound of said base strip of substantially uniform transverse thickness to form longitudinal ridges underlying the edge portions of said tread strip.

2. A method of preparing composite tread and side wall strips having a tread portion and a base portion of different rubber compounds, which comprises forming a tread strip by shaping a relatively wear-resistant compound to a strip having suitable width for forming the road contacting surface of a tire, separately shaping a different rubber compound, of a type suitable for side wall coverings of a tire, to a relatively flat base strip having greater width than that of said tread strip, feeding said tread strip strongly against said base strip while retaining said tread strip against a rigid backing and in a form having a transverse and longitudinal curvature and while retaining one surface of said base strip also against a rigid backing with a curved longitudinal surface and simultaneously causing portions of said base strip to flow through a bank of rubber into contact with edge portions of said tread strip to form substantially parallel longitudinal ridges on said base strip intermediate its ends and adjacent edges of said tread strip.

3. A method of preparing a composite strip to form the tread and side wall of a tire, with a tread portion of a wear-resistant rubber compound and a wider base portion of a different rubber compound and suitable for the side wall coverings of the tire, which comprises preparing a tread strip by shaping a rubber compound to a strip of suitable width for forming the road contacting surface of a tire, preparing a base strip of a generally uniform thickness by separately shaping a second rubber compound to a relatively flat strip having greater width than that of said tread strip and having about the average thickness of said base portion, pressing said tread strip against said base strip while retaining the outer surface of said tread strip that is adapted to contact said base strip in a form having transverse curvature and while the marginal edges of said base strip project beyond the marginal edges of said tread strip, and displacing rubber compound from the marginal edges of said base strip inwardly toward the axis of said base strip to form longitudinal ridges in the base portion of said composite tread underlying at least part of said tread strip.

4. A method of preparing a composite strip to form the tread and side wall of a tire, with a tread portion of a wear-resistant rubber compound and a wider base portion of a different rubber compound and suitable for the side wall coverings of the tire, which comprises preparing a tread strip by shaping a rubber compound to a strip of suitable width for forming the road contacting surface of a tire, preparing a base strip by separately shaping a second rubber compound to a strip of substantially uniform thickness having greater width than that of said tread strip and having about the average thickness of said base portion, pressing said tread strip against said base strip while retaining the outer surface of said tread strip that is adapted to contact said base strip in a form having transverse curvature and while the marginal edges of said base strip project beyond the marginal edges of said tread strip, and displacing rubber compound from the marginal edges of said base strip inwardly toward the axis of said base strip to form longitudinal ridges in the base portion of said composite tread underlying at least part of said tread strip, and substantially simultaneously displacing rubber compound from said tread strip to form marginal edge portions overlying said ridges.

5. A method of preparing a composite strip to form the tread and side wall of a tire, with a tread portion of a wear-resistant rubber compound and a wider base portion of a different rubber compound and suitable for the side wall coverings of the tire, which comprises preparing a tread strip by shaping a rubber compound to a strip of suitable width for forming the road contacting surface of a tire, preparing a base strip by separately shaping a second rubber compound to a relatively flat strip having greater width than that of said tread strip and having about the average thickness of said base portion, feeding said tread strip against said base strip while retaining said tread strip against a rigid backing and while retaining the outer surface thereof for contact with said base strip in a form having a curved transverse shape, the marginal edges of said base strip projecting beyond the marginal edges of said tread strip, displacing rubber compound from said marginal edges of said base strip first into a bank of rubber and then inwardly toward the axis of said base strip to form longitudinal ridges in said base portion underlying at least part of said tread strip, and substantially simultaneously displacing rubber compound from said tread strip to form marginal edge portions overlying said ridges, whereby rubber of said tread strip is united to rubber of said base strip under conditions of turbulence.

6. A method of preparing a composite strip to form the tread and side wall of a tire, with a tread portion of a wear-resistant rubber compound and a wider base portion of a different rubber compound and suitable for the side wall coverings of the tire, which comprises preparing a tread strip by extruding a rubber compound in the form of a strip having suitable width for forming the road contacting surface of a tire, preparing a base strip by separately calendering a second rubber compound to a relatively flat strip having greater width than that of said tread strip and having about the average thickness of said base portion, feeding said tread strip into contact with said base strip while retaining said tread strip in a form having transverse and longitudinal curvature and while retaining said base strip in a form having longitudinal curvature, with the marginal edges of said base strip projecting beyond the marginal edges of said tread strip, and displacing rubber compound from said marginal edges of said base strip inwardly toward the axis of said base strip to form longitudinal ridges in said base portion underlying at least part of said tread strip.

7. A method of preparing composite tread and side wall strips having a tread portion and a base portion of different rubber compounds, which comprises forming a tread strip by shaping a relatively wear-resistant compound to a strip having suitable width for forming the road-contacting surface of a tire, separately shaping a different rubber compound, of a type suitable for side wall coverings of a tire, to a relatively flat base strip having greater width than the width of said tread strip, feeding said tread strip against said base strip while retaining said tread strip in a form having a curved transverse surface, and while said tread strip is retained in said curved form causing flow of rubber compound of said base strip to form longitudinal ridges of said rubber compound underlying said tread strip in the region of the edge portions thereof.

8. A method of joining strips of millable plastic rubberlike material, which comprises rigidly supporting both strips over an area where juncture is first to occur, and changing the thickness of at least one of said strips at the moment of juncture to cause lateral flow and intermingling of materials of both of said strips at the juncture of said strips, whereby said strips are blended together over substantial portions of the interface between said strips.

9. A method of preparing a composite tread and side wall strips from two different plastic rubberlike compounds, which comprises forming a tread strip of one of said rubberlike compounds, forming a second strip of greater width of another of said rubberlike compounds, supporting both of said strips over the area where initial contact is to occur, and changing the thickness of portions of said second strip at the moment of juncture to cause lateral flow and intermingling of material from both of said strips at the juncture of said strips, whereby the material of said strips is blended together over substantial portions of the interface between said strips.

10. A method of forming a composite strip from two separate rubberlike compounds, which comprises forming separate strips from each of said rubberlike compounds, superimposing one of said strips on the other, supporting both of said strips over the area of initial contact, and increasing the thickness of a portion, simultaneously decreasing the thickness of another portion of at least one of said strips at the moment of juncture with the other of said strips to cause lateral flow of one of said rubberlike compounds and intermingling of material of both of said strips at the juncture of said strips.

CHALMER L. BEWARD.

REFERENCES CITED

The following references are of record in the file of this patent:

UNITED STATES PATENTS

| Number | Name | Date |
|---|---|---|
| 1,352,164 | Gelm | Sept. 7, 1920 |
| 1,403,058 | Pushee | Jan. 10, 1922 |
| 1,913,330 | Brickman | June 6, 1933 |
| 2,230,072 | Bowers | Jan. 28, 1941 |
| 2,232,488 | Smith | Feb. 18, 1941 |
| 2,377,018 | Leguillon et al. | May 29, 1945 |